(12) United States Patent
Ma et al.

(10) Patent No.: US 11,074,287 B2
(45) Date of Patent: Jul. 27, 2021

(54) MULTIMEDIA SERVICE DATA PROCESSING METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventors: Yongbin Ma, Shenzhen (CN); Xingxin Pei, Shenzhen (CN); Shifei Lin, Shenzhen (CN); Qiyun Su, Shenzhen (CN); Zhendong Tang, Shenzhen (CN); Lingling Yao, Shenzhen (CN); Lu Yao, Shenzhen (CN); Can Zheng, Shenzhen (CN); Rong Yan, Shenzhen (CN); Chao Zheng, Shenzhen (CN); Chunqiang Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 212 days.

(21) Appl. No.: 16/365,277

(22) Filed: Mar. 26, 2019

(65) Prior Publication Data
US 2019/0220476 A1  Jul. 18, 2019

Related U.S. Application Data

(63) Continuation of application No. PCT/CN2017/119091, filed on Dec. 27, 2017.

(30) Foreign Application Priority Data

Dec. 29, 2016  (CN) .......................... 201611245876.8

(51) Int. Cl.
*G06F 16/438* (2019.01)
*G06F 16/41* (2019.01)
(Continued)

(52) U.S. Cl.
CPC ............ *G06F 16/438* (2019.01); *G06F 16/41* (2019.01); *G06F 16/4387* (2019.01);
(Continued)

(58) Field of Classification Search
CPC .... G06F 16/1438; G06F 16/141; G06F 16/41; G06F 16/4387; G06F 16/447;
(Continued)

(56) References Cited

U.S. PATENT DOCUMENTS

| 8,214,518 | B1* | 7/2012 | Bertz | .......... H04L 65/607 |
| | | | | 709/231 |
| 8,913,726 | B2* | 12/2014 | Brown | ............... H04L 51/36 |
| | | | | 379/142.04 |

(Continued)

FOREIGN PATENT DOCUMENTS

| CN | 101281516 | 10/2008 |
| CN | 101588387 | 11/2009 |

(Continued)

OTHER PUBLICATIONS

International Search Report dated Apr. 4, 2018 in PCT/CN2017/119091 filed Dec. 27, 2017. (with English Translation) p. 1-7.

(Continued)

*Primary Examiner* — Hosain T Alam
*Assistant Examiner* — Chongsuh Park
(74) *Attorney, Agent, or Firm* — Oblon, McClelland, Maier & Neustadt, L.L.P.

(57) ABSTRACT

Interface circuitry of an apparatus receives a first service data packet that includes at least first information for a first multimedia presentation frame and second information for a second multimedia presentation frame. Processing circuitry of the apparatus stores the first information and the second information in different rows having different row number in a service data table. Then the processing circuitry deter- (Continued)

mines, from a preset database, first material data for the first multimedia presentation frame and second material data for the multimedia presentation frame based on material configuration information in the first service data packet. Further the processing circuitry associates the first material data and the second material data in a material data table with different row numbers in the service data table and generates first multimedia service data corresponding to the first service data packet based on the association between the service data table and the material data table.

20 Claims, 5 Drawing Sheets

(51) Int. Cl.
  *G06Q 30/02* (2012.01)
  *G06F 16/44* (2019.01)
  *H04L 29/08* (2006.01)
(52) U.S. Cl.
  CPC ....... *G06F 16/447* (2019.01); *G06Q 30/0251* (2013.01); *G06Q 30/0271* (2013.01); *G06Q 30/0272* (2013.01); *G06Q 30/0277* (2013.01); *H04L 67/26* (2013.01)
(58) Field of Classification Search
  CPC ............ G06F 16/438; G06Q 30/10251; G06Q 30/0277; G06Q 30/0272; G06Q 30/0271; G06Q 30/0251; H04L 67/26
  See application file for complete search history.

(56) References Cited

U.S. PATENT DOCUMENTS

| | | | |
|---|---|---|---|
| 9,342,209 B1* | 5/2016 | Hwang | G06Q 10/10 |
| 2013/0275205 A1* | 10/2013 | Vinson | G06Q 30/0243 |
| | | | 705/14.42 |
| 2014/0059244 A1* | 2/2014 | Panje | H04N 21/234363 |
| | | | 709/231 |
| 2014/0173660 A1* | 6/2014 | Correa | H04L 65/602 |
| | | | 725/42 |
| 2016/0266864 A1* | 9/2016 | Rajendran | G06F 3/0482 |

FOREIGN PATENT DOCUMENTS

| | | |
|---|---|---|
| CN | 101951441 | 1/2011 |
| CN | 103200262 | 7/2013 |
| CN | 104244032 | 12/2014 |
| CN | 104516892 | 4/2015 |
| CN | 105869021 | 8/2016 |
| CN | 106156251 | 11/2016 |
| CN | 106204123 | 12/2016 |
| CN | 106709033 | 5/2017 |
| KR | 100840019 | 6/2008 |
| WO | 2015172576 | 11/2015 |

OTHER PUBLICATIONS

Written Opinion dated Apr. 4, 2018 in PCT/CN2017/119091 filed Dec. 27, 2017. p. 1-4.
Combined Office Action and Search Report dated Oct. 22, 2019 in Chinese Patent Application No. 201611245876.8 (with Concise English language translation), p. 1-13.

* cited by examiner

MULTIMEDIA SERVICE DATA PROCESSING METHOD AND APPARATUS, SERVER, AND STORAGE MEDIUM

RELATED APPLICATION

This application is a continuation of International Application No. PCT/CN2017/119091, filed on Dec. 27, 2017, which claims priority to Chinese Patent Application No. 201611245876.8, filed on Dec. 29, 2016. The entire disclosures of the prior applications are hereby incorporated by reference in their entirety.

FIELD OF THE TECHNOLOGY

This application relates to the field of Internet technologies, and in particular, to a multimedia service data processing method and apparatus, a server, and a computer storage medium.

BACKGROUND OF THE DISCLOSURE

Official accounts in current instant communication applications may push some service messages such as advertisement messages to user groups, to enrich functions of the official accounts. Therefore, the advertisement service platform may obtain advertisement data uploaded by advertisers, and store, in a same row in an advertisement data table, a plurality of pieces of material data (for example, multimedia data such as pictures, videos, and text) in the advertisement data and location information and links of the material data in an advertisement interface. That is, one piece of advertisement data corresponds to one row in the advertisement data table. Therefore, when there are excessive material data and links in the advertisement data, the advertisement data table cannot store the advertisement data, which goes against extension of the advertisement data. In addition, when both two pieces of advertisement data include same material data, an advertiser still needs to upload the same material data when uploading the two pieces of advertisement data separately, reducing the use efficiency of the material data.

An advertisement service platform may send cached advertisement data and corresponding push object information to an official account platform, so that the official account platform may deliver associated advertisement data to a client based on the object information when a user goes online. However, because a time for the user to go online is undetermined, after the user logs in to the official account platform at a relatively long time interval, the official account platform pushes all advertisement data accumulated within this time period to the client. In this case, advertisement data pushed at an earlier time point may be overwhelmed in a large amount of historical data, severely reducing a probability that the advertisement data is clicked and read. Therefore, pushing the advertisement data is bound to waste traffic of the client.

SUMMARY

Aspects of the disclosure provide methods and apparatus for processing multimedia service data. In some embodiments, an apparatus for processing multimedia service data includes interface circuitry and processing circuitry. The interface circuitry receives a first service data packet that includes at least first information for a first multimedia presentation frame and second information for a second multimedia presentation frame. The processing circuitry stores the first information for the first multimedia presentation frame in a first row having a first row number in a service data table, and the second information for the second multimedia presentation frame in a second row having a second row number that is different from the first row number in the service data table. Then the processing circuitry determines, from a preset database, first material data for the first multimedia presentation frame and second material data for the multimedia presentation frame based on material configuration information in the first service data packet. Further the processing circuitry associates the first material data in a material data table with the first row number and the second material data in the material data table with the second row number and generates first multimedia service data corresponding to the first service data packet based on the association between the service data table and the material data table. The first service data includes the first multimedia presentation frame filled with the first material data that is associated by the first row number, and the second multimedia presentation frame filled with the second material data that is associated by the second row number.

In some embodiments, when the material data table lacks the first material data, the processing circuitry adds the first material data into an empty row of the material data table; and associates the first material data in a material data table with the first row number.

In some embodiments, the processing circuitry stores the first multimedia service data with other multimedia service data in a target data table.

According to an aspect of the disclosure, the interface circuitry receives, from a client device, a push request carrying user information. Then, the processing circuitry determines a user behavior characteristic base on the user information, selects a target multimedia service data from the target data table based on service information of the target multimedia service data and at least one of the user information and the user behavior characteristic, and then sends, via the interface circuitry, the target multimedia service data to the client device.

Further, in some examples, the processing circuitry stores the first multimedia service data with a first user group information that is carried in the first service data packet in the target data table, and stores the other multimedia service data with respective user group information.

Then, in some embodiments, the processing circuitry selects a first group of multimedia service data with a specific user group information that matches the user information, and selects a second group of multimedia service data from the first group of multimedia service data based on sorted click-through rates of the first group of multimedia serviced data. Further, the processing circuitry selects the target multimedia service data from the second group of multimedia service data based on the user behavior characteristic.

In addition, in some examples, the processing circuitry determines, based on service information respectively corresponding of the second group of multimedia service data, respective exposure probabilities for the second group of multimedia service data, and collects, in a historical time period, statistics of the user behavior characteristic associated with the user information. Further, the processing circuitry determines a favorite service data type based on the user behavior characteristic, calculate, respective recommendation scores for the second group of multimedia service data based on the favorite service data type, the respective exposure probabilities, and the click-through rates, and determine the target multimedia service data from the second group of multimedia service data that has a highest recommendation score.

In some embodiments, when the first service data packet comprises a landing page address, the processing circuitry sends, via the interface circuitry, the target multimedia service data with a click region that is bound with the landing page address to a server device for a public instant communication platform that forwards the target multimedia service data to the client device to cause a call to a landing page corresponding to the landing page address in response to a click in the click region.

In some examples, the processing circuitry then obtains at least one of arrival information, click information, and reading information that correspond to the target multimedia service data and are fed back from the client device.

Aspects of the disclosure also provide a non-transitory computer-readable medium storing instructions which when executed by a computer cause the computer to perform any of the methods for processing multimedia service data, as described above.

BRIEF DESCRIPTION OF THE DRAWINGS

To describe the technical solutions in the embodiments of this application or in the related technology more clearly, the following briefly describes the accompanying drawings required for describing the embodiments or the related technology. The accompanying drawings in the following description show merely some embodiments of this application, and a person of ordinary skill in the art may still derive other drawings from these accompanying drawings.

DESCRIPTION OF EMBODIMENTS

The following clearly and completely describes the technical solutions in the embodiments of this application with reference to the accompanying drawings in the embodiments of this application. The described embodiments are some embodiments of this application rather than all of the embodiments. All other embodiments obtained by persons skilled in the art based on the embodiments of the present application shall fall within the protection scope of the present application.

Figure 1:
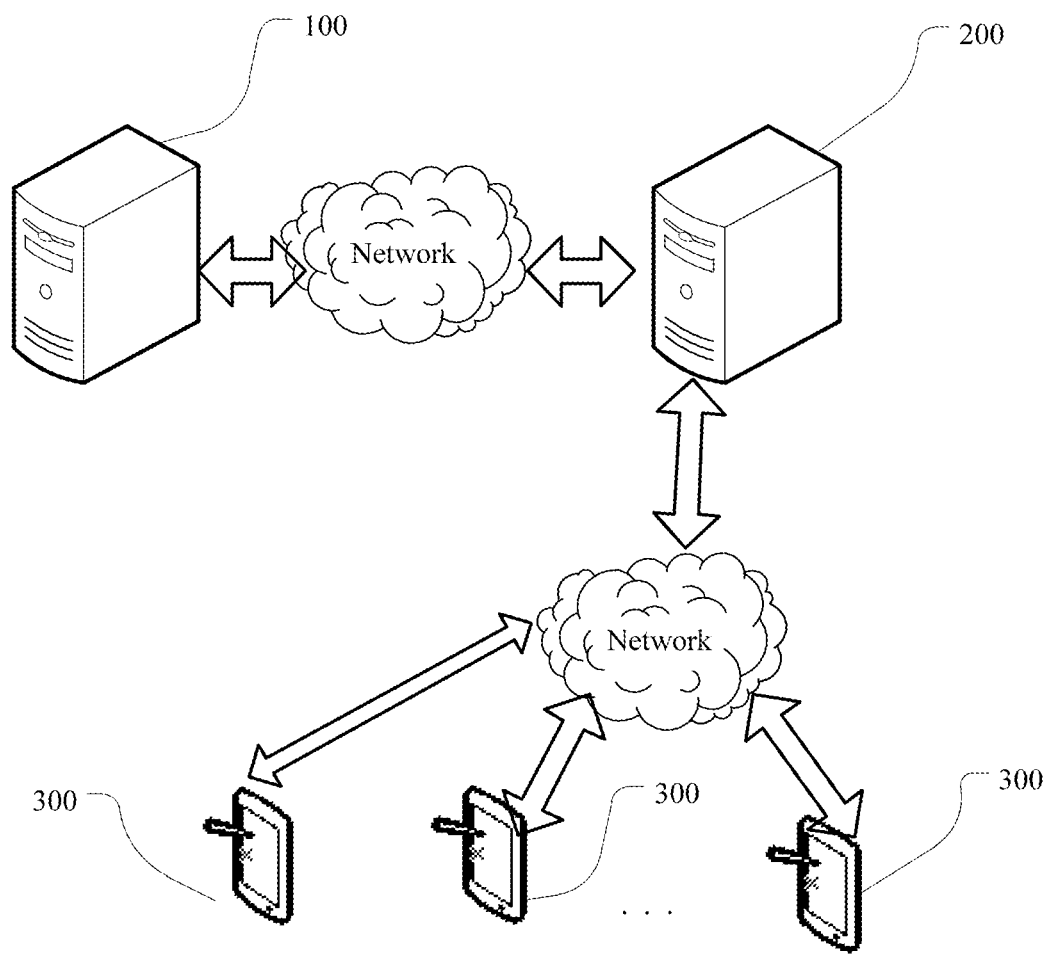
FIG. 1 is a schematic structural diagram of a network architecture according to an embodiment of this application.

Referring to FIG. 1, FIG. 1 is a schematic structural diagram of a network architecture according to an embodiment of this application. The network architecture may include a service server 100, an official-account background server 200, and a plurality of clients 300. The service server 100 may perform network communication with the official-account background server 200. The official-account background server 200 may perform network communication with the plurality of clients 300 separately. The service server 100 may obtain a service data packet (the service data packet may be advertisement data to be promoted by an advertiser) uploaded by an advertiser, for example, receive from an advertisement server of the advertiser, or receive, from a human-machine interactive interface of the service server 100, the service data packet provided by the advertiser.

The service data packet may include at least one piece of multimedia presentation frame data and material configuration information. The multimedia presentation frame data is a presentation frame used for adding multimedia data such as pictures and videos. The material configuration information includes material information that needs to be configured for each piece of multimedia presentation frame data. The service data packet herein may be an original data packet provided by the advertiser, including both the multimedia presentation frame data and the material configuration information that needs to be fused. The multimedia presentation frame data herein may include information such as a shape parameter of the presentation frame, a size parameter, and a location parameter. The shape parameter is used for indicating a shape of the presentation frame. For example, the shape parameter is used for indicating that the corresponding presentation frame is a circular presentation frame, a rectangular presentation frame, a bordered presentation frame, a borderless presentation frame, or the like and is a parameter reflecting a presentation frame shape feature. The size parameter may include information indicating parameters such as an area, a length, a width, a height, and the like of the presentation frame. The location parameter may include a parameter used for indicating location coordinates or a display area of the presentation frame on an advertisement page interface. Certainly, in some embodiments, the multimedia presentation frame data may further include pixel data required for displaying the presentation frame, and the like. In conclusion, the multimedia presentation frame data includes many types of specific content, and the content is not limited to any one of the foregoing information.

The material information may be information about various materials that need to be presented in a multimedia presentation frame. If the service data is an advertisement, the material data may correspond to advertisement content. In conclusion, the material information is to-be-presented information content, for example, may be various information such as advertisement pictures, advertisement videos, and advertisement text.

The service server 100 adds at least one piece of multimedia presentation frame data in the service data packet respectively to different rows in a service data table, each row in the service data table corresponding to a different row number.

For example, an advertiser uploads a piece of advertisement data A (the service data packet). The advertisement data A may include multimedia presentation frame data a, multimedia presentation frame data b, and multimedia presentation frame data c.

The multimedia presentation frame data a, the multimedia presentation frame data b, and the multimedia presentation frame data c each may include location information thereof in an advertisement interface. If the advertisement interface is divided into three regions, upper, middle, and lower regions, the multimedia presentation frame data a may be located in the uppermost region of the advertisement interface, the multimedia presentation frame data b may be located in the middle region of the advertisement interface, and the multimedia presentation frame data c may be located in the lowermost region of the advertisement interface. Therefore, the service server 100 may determine row locations of the multimedia presentation frame data in the service data table based on an arrangement sequence of location information corresponding to the multimedia presentation frame data, for example, may place the multimedia presentation frame data a located in the uppermost region of the advertisement interface in the first row (corresponding to row number 1) of the service data table, and by analog, place the multimedia presentation frame data b in the second row (corresponding to row number 2) of the service data table, and place the multimedia presentation frame data c in the third row (corresponding to the row number 3) of the service data table.

Because different multimedia presentation frame data may be stored in different rows of the service data table, it can be ensured that the service data table can store any amount of multimedia presentation frame data.

In this embodiment, a row-to-column conversion operation may be performed on the multimedia presentation frame data according to a preset rule. For example, for multimedia presentation frame data at different location in the advertisement interface, a plurality of pieces of multimedia presentation frame data located in a same row is placed in a plurality of rows based on the locations and a row/column conversion relationship. For example, one row in a current service data packet includes M pieces of multimedia presentation frame data, which is greater than a maximum value N of multimedia presentation frame data that can be accommodated in one row. Therefore, when the service data table and the material data table are generated, the M pieces of multimedia presentation frame data are distributed in $\lceil M/N \rceil$ rows. For example, the data of the $(N+1)^{th}$ to the $M^{th}$ multimedia presentation frames in the service data table are distributed in the last $\lceil M/N \rceil -1$ rows.

For example, if the advertiser wants to present 10 pictures, 2 videos, and 8 paragraphs of text simultaneously in the advertisement interface, the service server 100 may store, in different rows of the service data table, 20 pieces of multimedia presentation frame data corresponding to the 10 pictures, 2 videos, and 8 paragraphs of text, thereby avoiding a storage failure of the multimedia presentation frame data caused by that the service data table places the 20 pieces of multimedia presentation frame data in a same row. Because the number of rows of the service data table is not limited, the advertiser may further expand the number of pictures, the number of videos, and the like in the advertisement interface. Optionally, if the service data packet includes at least one landing page address, the landing page address may also be stored in the different rows of the service data table.

The landing page may be a display page connected to through various forms of links. for example, for an advertisement, an advertisement page jumped to through a link set on another page. The link may include a text link and/or a picture link. The text link may include character strings. The picture link may be a link set for a picture. If an operation triggering a link jump, for example, a click operation, for the picture is detected, a corresponding display page may be jumped to. For an advertisement, the landing page may be a detailed page presenting the advertisement in a more detailed manner.

The service server 100 then selects, from a preset database based on material configuration information in the service data packet, material data corresponding to each piece of multimedia presentation frame data. For example, the service server 100 may obtain, from the database, a material data set associated with the advertiser sending the service data packet, and then select, from the material data set based on the material configuration information, the material data corresponding to each piece of multimedia presentation frame data. The service server 100 may further add the selected material data to the material data table, and configure at least one row number for each piece of material data in the material data table based on the material configuration information. In this embodiment, the row number in the material data table is in a one-to-one correspondence with the row number in the service data table. For example, the service data packet includes the multimedia presentation frame data and the material configuration information.

The material configuration information is used for point to optional material data, and may further be used for indicating a correspondence between the material data and the multimedia presentation frame data. For example, the service data packet A includes multimedia presentation frame data A and material configuration information A. The material configuration information A points to material data A and explicitly indicates by using indication information or implicitly indicates by using the correspondence, that the material data A needs to be filled in a presentation frame corresponding to the multimedia presentation frame data. When the service data table and the material data table are generated, a row number needs to be set based on a filling relationship between the multimedia presentation frame data and the material data. For example, the multimedia presentation frame data A and the material data A have a same row number in the service data table and the material data table. This facilitates correct fusion of the multimedia presentation frame data A and the material data A in a subsequent step, so as to generate to-be-pushed target data table.

For example, if the material configuration information indicates that multimedia presentation frame data a corresponds to a picture material a, multimedia presentation frame data b corresponds to a picture material b, and multimedia presentation frame data c corresponds to a video material c, and in the service data table, the multimedia presentation frame data a corresponds to a row number 1, the multimedia presentation frame data b corresponds to a row number 2, and the multimedia presentation frame data c corresponds to a row number 3, the service server 100 may configure a row number 1 for the picture material a in the material data table, configure a row number 2 for picture material b in the material data table, and configure a row number 3 for the video material c in the material data table.

The material data in the database may be uploaded by the advertiser together with a currently sent service data packet, may be carried in a historic service data packet sent by the advertiser, or may be universal material data pre-stored in the service server 100.

Because the service data packet carries the material configuration information, the advertiser may not need to repeatedly upload same material data. For example, the advertiser uses a picture a in the advertisement data A, and also uses the picture a in advertisement data B. In this case, the advertiser may upload the picture a together with the advertisement data A, and may not need to upload the picture a when the advertisement data B is subsequently uploaded, provided that material configuration information of a piece of multimedia presentation frame data and the picture a is uploaded. If the multimedia presentation frame data a in the advertisement data A corresponds to the picture a, the multimedia presentation frame data b in the advertisement data B corresponds to the picture a, the row number of the multimedia presentation frame data a in the service data table is 1, and the row number of the multimedia presentation frame data b in the service data table is 8, row numbers corresponding to the picture a in the material data table include 1 and 8.

The service server 100 may further fuse multimedia presentation frame data and material data having a same row number in the service data table and the material data table.

For example, for the row number 1 corresponding to the multimedia presentation frame data a in the service data table, the row number 2 corresponding to the multimedia presentation frame data b, the row number 3 corresponding to the multimedia presentation frame data c, the row number 4 corresponding to multimedia presentation frame data d, the row number 5 corresponding to multimedia presentation frame data e, the multimedia presentation frame data a, the multimedia presentation frame data b, and the multimedia presentation frame data c belong to the service data packet A, and the multimedia presentation frame data d and the multimedia presentation frame data e belongs to a service data packet B. In the material data table, the picture material a corresponds to the row numbers 1 and 4, the picture material b corresponds to the row number 2, the video material c corresponds to the row number 3, and the text material d corresponds to the row number 5. During data fusion. the service server 100 may add the picture material a to the multimedia presentation frame data a for fusion, add the picture material b to the multimedia presentation frame data b for fusion, and add the video material c to the multimedia presentation frame data c for fusion, so that each piece of multimedia presentation frame data in the service data packet A is fused with corresponding material data. Further, the service data packet A fused with the material data is determined as to-be-pushed service data. Likewise, the service server 100 may add the picture material a to the multimedia presentation frame data d for fusion (It can be learned that, one piece of material data may be applied to a plurality of pieces of different advertisement data, to reuse the material data), and add the text material d to the multimedia presentation frame data e for fusion, so that each piece of multimedia presentation frame data in the service data packet B is fused with corresponding material data. Further, the service data packet B fused with the material data is determined as to-be-pushed service data. The service server 100 then stores a plurality of pieces of generated to-be-pushed service data in the target data table (that the to-be-pushed service data is stored in the target data table is equivalent to that the to-be-pushed service data is networked, so that in a subsequent advertisement push process, corresponding to-be-pushed service data can be directly obtained from the target data table).

Then, any one of the clients 300 is used as an example. When the client 300 goes online (that is, logs into the official-account background server 200), the client 300 may send a push request to the official-account background server 200. Then the official-account background server 200 forwards the push request to the service server 100. The service server 100 may calculate a user behavior characteristic corresponding to user information carried in the push request, and selects, from the target data table based on service information (the service information may include information such as advertisement bid information and advertisement order completion) corresponding to each piece of to-be-pushed service data in the target data table, the user information, and the user behavior characteristic, target to-be-pushed service data matching the client 300, and send the target to-be-pushed service data to the official-account background server 200. Then the official-account background server 200 forwards the target to-be-pushed service data to the client 300. When a user goes online (that is, a push request is generated), target to-be-pushed service data matching the user is analyzed, and then the target to-be-pushed service data is delivered to the client 300. Therefore, the client 300 checks only the target to-be-pushed service data, to improve a probability that the target to-be-pushed service data is clicked and read, thereby avoiding a waste of traffic in a user terminal.

The advertisement bid information may be at least one of the following:

a single push bid of the advertiser for to-be-pushed service data, a single exposure bid, an entire bid for service data push in predetermined duration, and an entire exposure bid. During application, a push priority may be set based on the advertisement bid information, and when both two pieces of to-be-pushed service data matches a target user, to-be-pushed service data having a higher priority is selected based on the priority and is preferably pushed.

The advertisement order completion may be a ratio of an actual completion parameter to a preset completion parameter. For example, in a predetermined time window, the predetermined number of pushes is S1, and a current actual number of pushes is S2. A smaller ratio of S2/S1 indicates smaller advertisement order completion, and the smaller advertisement order completion indicates a higher push priority. In this case, pushing is performed more preferably. Certainly, the advertisement order completion may also be a ratio of the actual number of exposures to the predetermined number of exposures. Herein, the related descriptions of the advertisement bid information and the advertisement order completion and a relationship between them and pushing are provided, but this application is not limited thereto during specific implementation.

Figure 2:
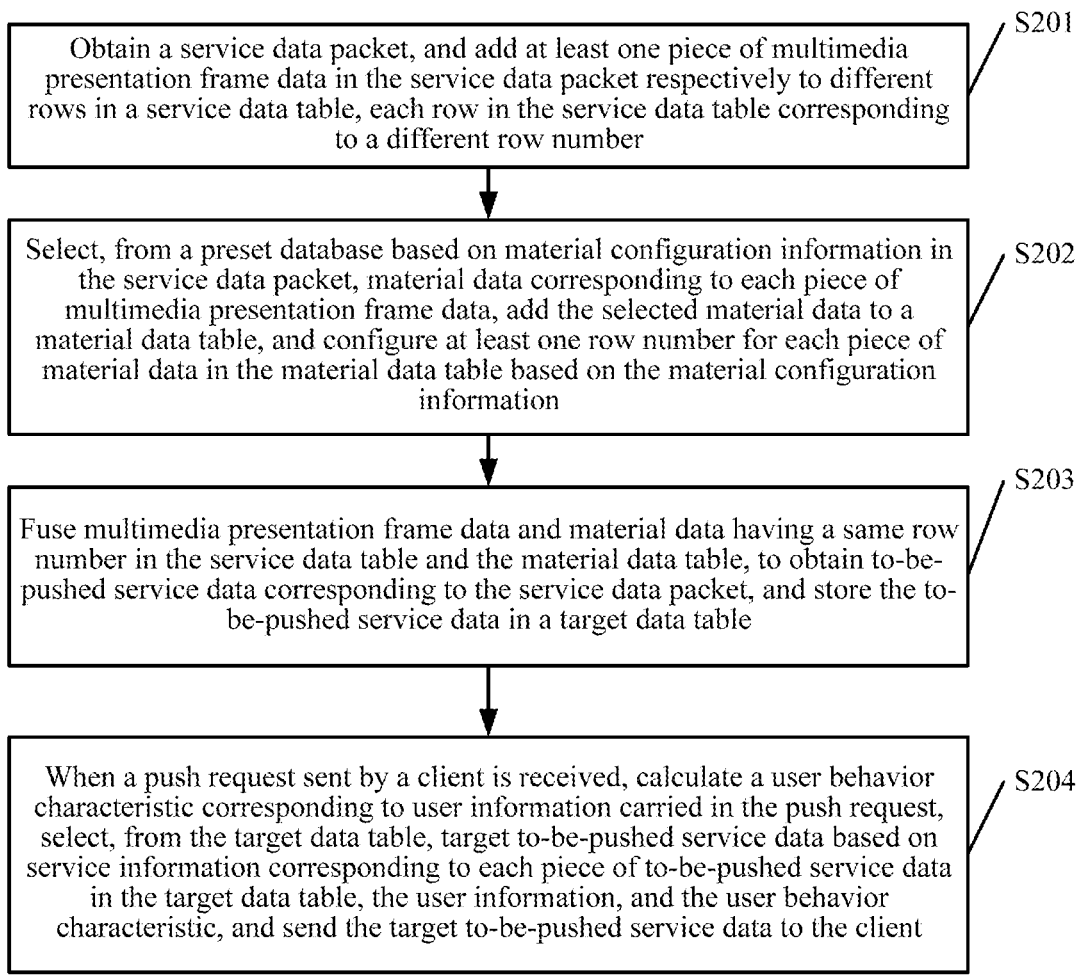
FIG. 2 is a schematic flowchart of a multimedia service data processing method according to an embodiment of this application.

Referring to FIG. 2, FIG. 2 is a schematic flowchart of a multimedia service data processing method according to an embodiment of this application. The method may include the following steps:

S201. Obtain a service data packet, and add at least one piece of multimedia presentation frame data in the service data packet respectively to different rows in a service data table, each row in the service data table corresponding to a different row number.

Optionally, a service server may obtain a service data packet uploaded by an advertiser terminal. The service data packet is an advertisement uploaded by the advertiser terminal.

The service data packet may include a plurality of pieces of multimedia presentation frame data, at least one landing page address, and material configuration information.

The multimedia presentation frame data is a presentation frame used for adding multimedia data such as pictures and videos. The material configuration information includes material information that needs to be configured for each piece of multimedia presentation frame data. That is, an interface for one advertisement may accommodate multimedia data such as a plurality of pictures, a plurality of paragraphs of text, and a plurality of videos.

The service server may provide an advertisement uploading interface for the advertiser terminal, and may provide, in the advertisement uploading interface, an advertisement data uploading interface and an uploading interface of the to-bepushed user group type information for the advertiser terminal. For example, an advertiser terminal uploads a game advertisement by using the advertisement data uploading interface in the advertisement uploading interface, the game advertisement including four pieces of multimedia presentation frame data and one landing page address, uploads material configuration information by using the advertisement data uploading interface, and configures the to-be-pushed user group type information to be "Beijing, 18 to 25 years old, male, Android mobile phone" by using the uploading interface of the to-be-pushed user group type information. Optionally, the advertiser terminal may further set information such as an advertisement purchase scale, a bid, and a budget in the advertisement uploading interface.

The service server may further add each piece of multimedia presentation frame data and each landing page address that are obtained to different rows in the service data table. Each row in the service data table corresponds to a different row number. For a specific form of the service data table, refer to the following Table 1:

TABLE 1

| Advertisement ID | Row number | Multimedia presentation frame data and landing page address |
|---|---|---|
| ID of advertisement A: XXX | 1 | Multimedia presentation frame data a1 (used for presenting a picture) |
|  | 2 | Multimedia presentation frame data a2 (used for presenting a picture) |
|  | 3 | Multimedia presentation frame data a3 (used for presenting text) |
| ID of advertisement B: XXX | 4 | Multimedia presentation frame data b1 (used for presenting a picture) |
|  | 5 | Multimedia presentation frame data b2 (used for presenting a picture) |
|  | 6 | Multimedia presentation frame data b3 (used for presenting a video) |
|  | 7 | Multimedia presentation frame data b4 (used for presenting text) |
|  | 8 | Landing page address b5 |
|  | 9 | Landing page address b6 |

As shown in Table 1, it can be learned that the advertisement A uploaded by the advertiser includes the multimedia presentation frame data a1, the multimedia presentation frame data a2, and the multimedia presentation frame data a3. Because the multimedia presentation frame data a1 is located in the uppermost part of an interface of the advertisement A, the multimedia presentation frame data a2 is located in the middle part of the interface of the advertisement A, and the multimedia presentation frame data a3 is located in the lowermost part in the interface of the advertisement A, the multimedia presentation frame data a1, the multimedia presentation frame data a2, and the multimedia presentation frame data a3 may be respectively added to corresponding rows in Table 1 (the service data table) based on a sequence of presentation regions corresponding to the multimedia presentation frame data. For example, the multimedia presentation frame data a1 corresponds to a row number 1, the multimedia presentation frame data a2 corresponds to a row number 2, and the multimedia presentation frame data a3 corresponds to a row number 3. In addition, the advertisement A has a corresponding ID "XXX" (that is, all data in the row numbers 1 to 3 is associated with the ID "XXX"). The advertisement B uploaded by the advertiser includes the multimedia presentation frame data b1, the multimedia presentation frame data b2, the multimedia presentation frame data b3, the multimedia presentation frame data b4, the landing page address b5, and the landing page address b6, and likewise, may add, based on a sequence of presentation regions of the multimedia presentation frame data in an interface of the advertisement B, the multimedia presentation frame data b1, the multimedia presentation frame data b2, the multimedia presentation frame data b3, the multimedia presentation frame data b4, the landing page address b5, and the landing page address b6 to corresponding rows in Table 1 (the service data table). For example, the multimedia presentation frame data b1 corresponds to a row number 4, the multimedia presentation frame data b2 corresponds to a row number 5, the multimedia presentation frame data b3 corresponds to a row number 6, the multimedia presentation frame data b4 corresponds to a row number 7, the landing page address b5 corresponds to a row number 8, and the landing page address b6 corresponds to a row number 9. In addition, the advertisement B has a corresponding ID "YYY" (that is, all data in the row numbers 4 to 9 are associated with the ID "YYY").

The service data table may include a plurality of rows. This application is no longer restricted to a maximum amount of data stored in one row. For example, only five pieces of multimedia presentation frame data and one landing page address can be stored in one row, and in this embodiment, more than one row can be set in the service data table. In this case, one service data packet is not limited to that a maximum amount of data is five pieces of multimedia presentation frame data and one landing page address. Therefore, to enable the advertiser to upload more multimedia presentation frame data and landing page addresses for one advertisement, in this embodiment of this application, a row-to-column conversion operation is performed on the service data table. That is, each piece of multimedia presentation frame data and each landing page address are respectively added to different rows in the service data table, thereby improving a data storage capability of the service data table. Because one row in the service data table can store only one piece of multimedia presentation frame data or one landing page address, the service data table can store any amount of multimedia presentation frame data and any amount of landing page address. Further, one advertisement uploaded by the advertiser can present any amount of multimedia data such as pictures, videos, and text.

S202. Select, from a preset database based on material configuration information in the service data packet, material data corresponding to each piece of multimedia presentation frame data, add the selected material data to a material data table, and configure at least one row number for each piece of material data in the material data table based on the material configuration information.

Optionally, the service server then selects, from the preset database based on the material configuration information in the service data packet, the material data corresponding to each piece of multimedia presentation frame data, (the service server may obtain, from the database, the material data set associated with the advertiser sending the service data packet, and then select, from the material data set based on the material configuration information, the material data corresponding to each piece of multimedia presentation frame data), adds the selected material data to the material data table, and configure the at least one row number for each piece of material data in the material data table based on the material configuration information. The material configuration information includes information about the material data corresponding to each piece of multimedia presentation frame data in the service data packet, and therefore, may configure a corresponding row number for corresponding material data based on a row number corresponding to each piece of multimedia presentation frame data. Material data that needs to be added for each piece of multimedia presentation frame data may be determined by the advertiser. For example, the advertiser may determine that a picture material b needs to be added to multimedia presentation frame data a in the advertisement A. If a picture material b has been uploaded by the advertiser to the service server, during uploading of the advertisement A, the advertiser only needs to upload a correspondence between the multimedia presentation frame data a and the picture material b (the correspondence is stored in the material configuration information), with no need to upload the picture material b again. If the picture material b does not exist in the service server, during uploading of the advertisement A, the advertiser may also upload the picture material b.

For an optional form of the material data table, refer to the following Table 2:

TABLE 2

| Configured row number | Material data |
|---|---|
| 1, 4 | Picture material a |
| 2, 5 | Picture material b |
| 3 | Text material c |
| 6 | Video material d |
| 7 | Text material e |

Table 2 is described with reference to Table 1. In Table 2, the picture material a corresponds to the row numbers 1 and 4, the picture material b corresponds to the row numbers 2 and 5, the text material c corresponds to the row number 3, the video material d corresponds to the row number 6, and the text material e corresponds to the row number 7. It can be learned that, the material configuration information corresponding to the advertisement A in Table 1 includes a correspondence between the multimedia presentation frame data a1 and the picture material a, a correspondence between the multimedia presentation frame data a2 and the picture material b, and a correspondence between the multimedia presentation frame data a3 and the text material c. At least one material data in the picture material a, the picture material b, and the text material c may be material data previously uploaded by the advertiser to the service server, or may be material data uploaded by the advertiser when uploading the advertisement A. The material configuration information corresponding to the advertisement B in Table 1 includes a correspondence between the multimedia presentation frame data b1 and the picture material a, a correspondence between the multimedia presentation frame data b2 and the picture material b, a correspondence between the multimedia presentation frame data b3 and the video material d, and a correspondence between the multimedia presentation frame data b4 and the text material e. At least one material data in the picture material a, the picture material b, the video material d, and the text material e may be material data previously uploaded by the advertiser to the service server, or may be material data uploaded by the advertiser when uploading the advertisement B.

Optionally, if the advertiser wants to push one advertisement to a plurality of different public instant communication platforms (the public instant communication platform refers to the official-account background server in the embodiment corresponding to FIG. 1, and may specifically be a Wechat official account background or a QQ official account background), the service server may set corresponding service data tables and the material data tables for the different public instant communication platforms respectively, and add each piece of multimedia presentation frame data of the advertisement to the service data tables corresponding to the public instant communication platforms, and add corresponding material data to the material data tables corresponding to the public instant communication platforms. For example, if the advertiser wants to push the advertisement A simultaneously on a Wechat official account platform and a QQ official account platform, the advertiser may upload a first service data packet corresponding to the advertisement A on the Wechat official account platform, and then add each piece of multimedia presentation frame data in the first service data packet to a service data table associated with the Wechat official account platform, and add, based on material configuration information in the first service data packet, related material data to a material data table associated with the Wechat official account platform. The advertiser may further upload a second service data packet corresponding to the advertisement A on the QQ official account platform, and then add each piece of multimedia presentation frame data in the second service data packet to a service data table associated with the QQ official account platform, and add, based on material configuration information in the second service data packet, related material data to a material data table associated with the QQ official account platform. The first service data packet is the same as the second service data packet. The advertiser needs to upload the material data related to the advertisement A only once (the existing material data can be reused by using the material configuration information), with no need to upload the material data related to the advertisement A during uploading of the advertisement A on the different the public instant communication platforms.

S203. Fuse multimedia presentation frame data and material data having a same row number in the service data table and the material data table, to obtain to-be-pushed service data corresponding to the service data packet, and store the to-be-pushed service data in a target data table.

Optionally, the service server may further fuse the multimedia presentation frame data and the material data having the same row number, to obtain the to-be-pushed service data corresponding to the service data packet. Using Table 1 and Table 2 as an example, the multimedia presentation frame data a1 having the row number 1 in Table 1 and the picture material a configured with the row number 1 in Table 2 may be fused to obtain the multimedia presentation frame data a1 filled with the picture material a. Likewise, the multimedia presentation frame data a2 having the row number 2 in Table 1 and the picture material b configured with the row number 2 in Table 2 may be fused to obtain the multimedia presentation frame data a2 filled with the picture material b, and the multimedia presentation frame data a3 having the row number 3 in Table 1 and the text material c configured with the row number 3 in Table 2 may be fused to obtain the multimedia presentation frame data a3 filled with the text material c. Further, the multimedia presentation frame data a1 filled with the picture material a, the multimedia presentation frame data a2 filled with the picture material b, and the multimedia presentation frame data a3 filled with the text material c may be encapsulated into to-be-pushed service data. That is, the to-be-pushed service data is to-be-pushed service data corresponding to the service data packet of the advertisement A, and an advertisement presentation interface corresponding to the to-be-pushed service data may include the picture material a, the picture material b, and the text material c displayed from top to down. Then, the advertisement B in Table 1 is used as an example. a process of fusing each piece of multimedia presentation frame data and material data in the advertisement B may be: The picture material a in Table 2 is added to the multimedia presentation frame data b1, the picture material b is added to the multimedia presentation frame data b2 (because both the picture material a and the picture material b are uploaded once, and different advertisements may use the picture material a and the picture material b at the same time, the picture material a and the picture material b are reused), the video material d is added to the multimedia presentation frame data b3, and the text material e is added to the multimedia presentation frame data b4. Further, the multimedia presentation frame data b1 filled with the picture material a, the multimedia presentation frame data b2 filled with the picture material b, the multimedia presentation frame data b3 filled with the video material d, the multimedia presentation frame data b4 filled with the text material e, the landing page address b5, and the landing page address b6 are encapsulated into to-be-pushed service data corresponding to the service data packet of the advertisement B. An advertisement presentation interface corresponding to the to-be-pushed service data may include the picture material a, the picture material b, the video material d, and the text material e displayed from top to down. The landing page address b5 may be bound to the picture material a, and the landing page address b6 may be bound to the picture material b, so that the landing page address b5 may be jumped to when the user clicks the picture material a in the to-be-pushed service data, and the landing page address b6 may be jumped to when the user clicks the picture material b in the to-be-pushed service data. The service server may further store each piece of generated to-be-pushed service data into the target data table, that is, the to-be-pushed service data is networked and released. Optionally, the different the public instant communication platform may be respectively associated with corresponding target data tables. Therefore, the to-be-pushed service data may be stored into a corresponding target data table based on a public instant communication platform associated with the to-be-pushed service data. For example, if to-be-pushed service data a needs to be pushed to the Wechat official account platform, the to-be-pushed service data a is stored into a target data table associated with the Wechat official account platform, and if to-be-pushed service data b needs to be pushed to the QQ official account platform, the to-be-pushed service data b is stored into a target data table associated with the QQ official account platform.

Optionally, the service server may set, by using a subscription service, an identifier (that is, an advertisement ID) of a service data packet corresponding to each piece of to-be-pushed service data in the target data table. Therefore, when the advertiser needs to update material data corresponding to one piece of multimedia presentation frame data in the service data packet, the service server may receive multimedia update sub data associated with the service data packet, and search, by using the subscription service, the target data table for the to-be-pushed service data having the identifier of the service data packet, and update the found to-be-pushed service data based on the multimedia update sub data. It can be learned that one advertisement ID may be bound to a plurality of pieces of multimedia presentation frame data by using the subscription service, so as to find corresponding to-be-pushed service data more efficiently when the multimedia presentation frame data is updated, and update the found to-be-pushed service data. Optionally, the advertisement ID may also be bound to at least one landing page address by using the subscription service. A data integration service in the service server may be used for configuring a corresponding row number for each piece of material data in the material data table. Therefore, when the material data is updated, based on a row number corresponding to the updated material data, multimedia presentation frame data having the same row number may be found by using the data integration service, so as to fuse the updated material data and the found multimedia presentation frame data again, and further update corresponding to-be-pushed service data. It can be learned that one advertisement ID may be bound to a plurality of pieces of multimedia presentation frame data and at least one landing page address by using the subscription service, so as to update to-be-pushed service data by using the subscription service. One piece of material data may be bound to a plurality of pieces of multimedia presentation frame data by using the data integration service, so as to update each piece of to-be-pushed service data including the to-be-updated material data by using the data integration service. The working efficiency of the service server may be effectively improved through coordination of the subscription service and the data integration service.

S204. When a push request sent by a client is received, calculate a user behavior characteristic corresponding to user information carried in the push request, select, from the target data table, target to-be-pushed service data based on service information corresponding to each piece of to-be-pushed service data in the target data table, the user information, and the user behavior characteristic, and send the target to-be-pushed service data to the client.

Optionally, when the client logs in to the public instant communication platform, the public instant communication platform may send the push request to the service server. Before the user goes online, the service server may pre-establish a reverse index offline based on to-be-pushed user group type information corresponding to each piece of to-be-pushed service data in the target data table. After receiving the push request (that is, after the user goes online), the service server may obtain the user information carried in the push request, and obtain, from the target data table, the to-be-pushed service data having the to-be-pushed user group type information matching the user information as the first to-be-pushed service data. For example, the user information includes a Wechat account number of the user. The service server parses a user avatar corresponding to the Wechat account number of the user, to determine basic information (for example, a gender, an age range, and the like) of the user. The service server further selects, as the first to-be-pushed service data from the target data table, to-be-pushed service data whose to-be-pushed user group type information is in conformity with the basic information of the user.

In this embodiment, information related to a user receiving service data pushing includes the user information and the user behavior characteristic. Generally, the user information may be user attribute information unrelated to the user behavior characteristic, for example, inherent attribute information such as an age, education, and a gender of the user. The user behavior characteristic may be information related to a user behavior, for example, a feature of an advertisement favorite by the user that is obtained based on statistics about an advertisement type clicked by the user. The user behavior may be an operation of the user in the client.

The service server further pre-estimates a click-through rate (which may be a lightweight click-through rate, for example, may be a click-through rate determined based on the resolution or a data content demand corresponding to each piece of first to-be-pushed service data) corresponding to each piece of first to-be-pushed service data, and selects a preset amount of first to-be-pushed service data in descending order of the click-through rates as second to-be-pushed service data.

For example, if there are 100 pieces of first to-be-pushed service data, and the preset amount is 50, the service server may rank the 100 pieces of first to-be-pushed service data in descending order of click-through rates corresponding to the 100 pieces of first to-be-pushed service data, and determine the first 50 pieces of first to-be-pushed service data as the second to-be-pushed service data.

The service server further calculates the user behavior characteristic corresponding to the user information, and selects, based on service information corresponding to each piece of second to-be-pushed service data and the user behavior characteristic, second to-be-pushed service data best matching the user information as the target to-be-pushed service data. The service information may include advertisement bid information and advertisement order completion.

Therefore, a specific implementation process of the step of calculating the user behavior characteristic corresponding to the user information, and selecting, based on service information corresponding to each piece of second to-be-pushed service data and the user behavior characteristic, second to-be-pushed service data best matching the user information as the target to-be-pushed service data may be: determining, based on advertisement bid information and advertisement order completion corresponding to each piece of second to-be-pushed service data, an exposure probability corresponding to each piece of second to-be-pushed service data, collecting, in a historical time period, statistics about the user behavior characteristic (for example, advertisement data clicked and browsed in a current day) associated with the user information, analyzing, based on the user behavior characteristic, a favorite service data type of a user (that is, analyzing types of advertisements favorite by the user, for example, sports and games), then calculating, based on the favorite service data type of the user, the exposure probability corresponding to each piece of second to-be-pushed service data, and the pre-estimated click-through rate (the click-through rate herein may be a high-precision click-through rate), a recommendation score corresponding to each piece of second to-be-pushed service data, and finally determining second to-be-pushed service data having a highest recommendation score as the target to-be-pushed service data (the second to-be-pushed service data having the highest recommendation score may be advertisement data that is favorite by the user and that is most possibly clicked and browsed by the user).

The service server further sends the target to-be-pushed service data to a public instant communication platform, so that the public instant communication platform delivers the target to-be-pushed service data to the client. After the client is connected and the push request is sent, the service server can select the target to-be-pushed service data from the target data table within 100 ms and send the target to-be-pushed service data to the public instant communication platform. Therefore, it can be ensured that the pushed target to-be-pushed service data can quickly and accurately arrive at the client, avoids that the target to-be-pushed service data cannot be accurately pushed to the client due to uncertainty of a connection time of the client, and also avoids that the pushed target to-be-pushed service data is overwhelmed in historical advertisement data, thereby improving the return on investment (ROI) of the advertiser.

Optionally, after step S204, that is, after the client receives the target to-be-pushed service data, the client may report arrival information to the public instant communication platform. Then, the public instant communication platform feeds back the arrival information to the service server, so that the service server may analyze a message arrival rate of each piece of to-be-pushed service data based on the collected arrival information. When the client detects a click operation on the target to-be-pushed service data, the client may report click information to the public instant communication platform. Then, the public instant communication platform feeds back the click information to the service server. Then, the service server collects a click-through rate of the to-be-pushed service data based on the collected click information and analyzes the user behavior characteristic.

Optionally, if the service data packet further includes at least one landing page address, the service server may further encapsulate the at least one landing page address into the target to-be-pushed service data. Further, the service server may send the target to-be-pushed service data and the click link that carry the at least one landing page address to the public instant communication platform together, and the public instant communication platform forwards the target to-be-pushed service data and the click link to the client, so that the client triggers the click link based on a click operation to report click information, and jumps to a landing page address corresponding to a click region based on the click operation (for example, the user performs a click operation on the picture material a in a presentation region in which the multimedia presentation frame data b1 in the advertisement is located, and in this case, the terminal may jumps to the landing page address b5 bound to the picture material a). That is, the landing page address is associated to a region on, for example a screen of the terminal, such as a mobile terminal, so that the mobile terminal can determine a click region based on the click operation of the user, and further jump to a landing page address corresponding to the click region. Because triggering of the click link is merely used for reporting a click behavior of the mobile terminal, there is no need to configure a corresponding click link for each landing page, that is, one advertisement (namely, the target to-be-pushed service data) only needs to have one click link. Therefore, traffic consumed by the mobile terminal can be reduced. Using the advertisement B in Table 1 as an example, if the public instant communication platform sends target to-be-pushed service data and a click link that correspond to the advertisement B to the mobile terminal, the landing page address b5 being bound to the picture material a in the multimedia presentation frame data b1, and the landing page address b6 being bound to the picture material b in the multimedia presentation frame data b2, when the user clicks a presentation region in which the multimedia presentation frame data b1 is located in the advertisement interface corresponding to the target to-be-pushed service data, the mobile terminal may extract the landing page address b5 that is bound to the picture material a in the clicked presentation region, and jump to the landing page address b5. In addition, the mobile terminal may trigger the click link to report a click behavior to the service server (regardless of clicking the picture material a or the picture material b in the advertisement interface, the click link may be triggered to report the click behavior of the user).

According to this embodiment of this application, the service data packet is obtained, and the at least one piece of multimedia presentation frame data in the service data packet is respectively added to different rows in the service data table, each row in the service data table corresponding to a different row number. Based on a row-to-column conversion operation performed on the multimedia presentation frame data in the service data table, a capability of storing the multimedia presentation frame data by the service data table can be effectively improved, thereby improving a capability of extending the service data packet, that is, one service data packet can carry more multimedia presentation frame data. In this way, one advertisement may include more multimedia data such as pictures, videos, and text. Further, the material data corresponding to each piece of multimedia presentation frame data is selected from the preset database based on the material configuration information in the service data packet, the selected material data is added to the material data table, and the at least one row number is configured for each piece of material data in the material data table based on the material configuration information. The multimedia presentation frame data and the material data having a same row number in the service data table and the material data table are fused, to obtain the to-be-pushed service data corresponding to the service data packet, and the to-be-pushed service data is stored in the target data table. The material data can be effectively reused by setting the material data table and the material configuration information. That is, same material data can be applied to multimedia presentation frame data in different service data packets without repeatedly uploading the same material data. When receiving the push request sent by the client, the user behavior characteristic corresponding to the user information carried in the push request is calculated, the target to-be-pushed service data is selected from the target data table based on the service information corresponding to each piece of to-be-pushed service data in the target data table, the user information, and the user behavior characteristic, and the target to-be-pushed service data is sent to the client. When the user goes online (that is, the push request is generated), target to-be-pushed service data matching the user is analyzed, and then the target to-be-pushed service data is delivered to the client. Therefore, the client checks only the target to-be-pushed service data, to improve a probability that the target to-be-pushed service data is clicked and read, thereby avoiding a waste of traffic in a user terminal.

Figure 3:
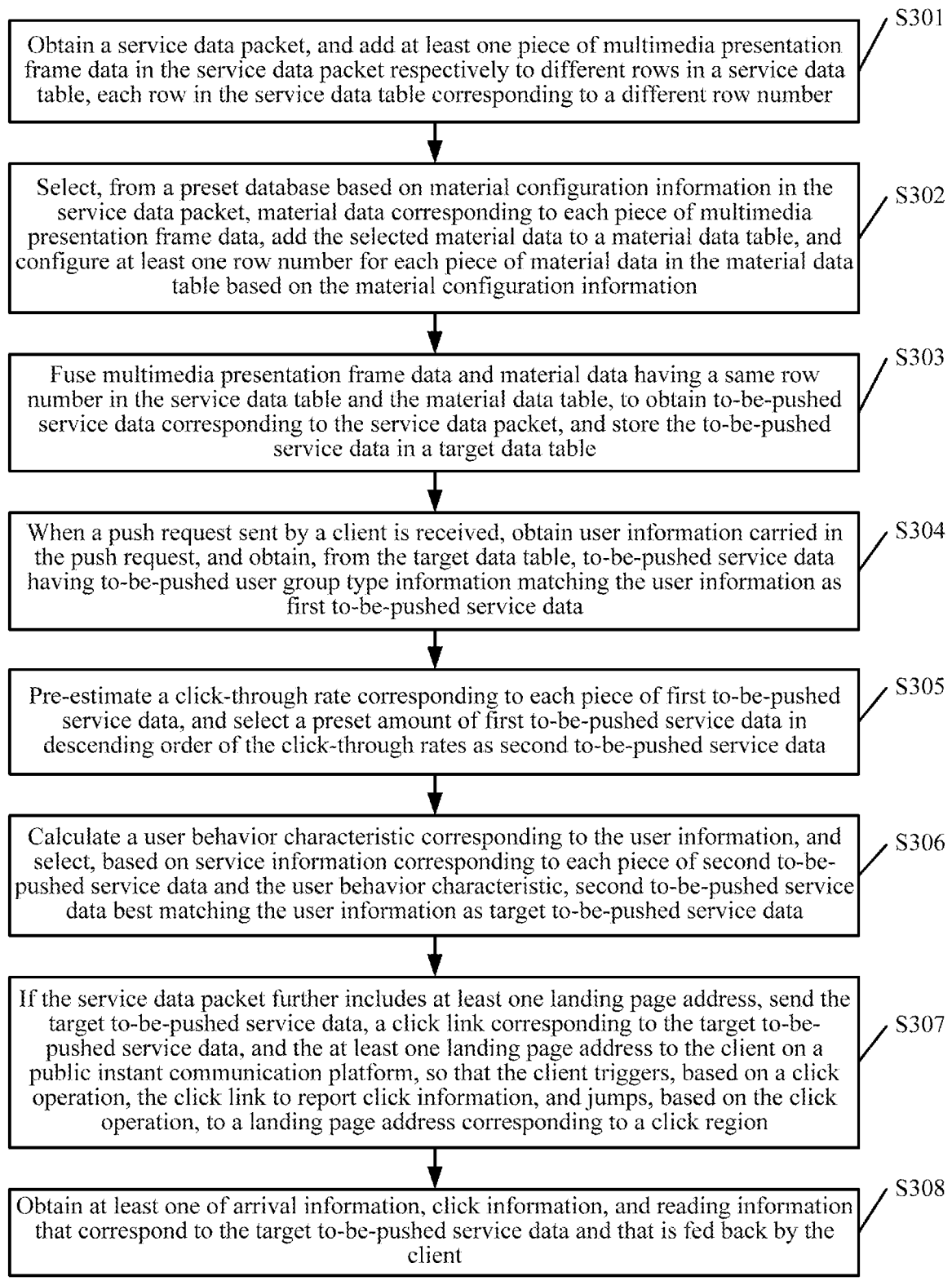
FIG. 3 is a schematic flowchart of another multimedia service data processing method according to an embodiment of this application.

Referring to FIG. 3, FIG. 3 is a schematic flowchart of another multimedia service data processing method according to an embodiment of this application. The method may include the following steps:

S301. Obtain a service data packet, and add at least one piece of multimedia presentation frame data in the service data packet respectively to different rows in a service data table, each row in the service data table corresponding to a different row number.

S302. Select, from a preset database based on material configuration information in the service data packet, material data corresponding to each piece of multimedia presentation frame data, add the selected material data to a material data table, and configure at least one row number for each piece of material data in the material data table based on the material configuration information.

S303. Fuse multimedia presentation frame data and material data having a same row number in the service data table and the material data table, to obtain to-be-pushed service data corresponding to the service data packet, and store the to-be-pushed service data in a target data table.

For specific implementation of step S301 to step S303, refer to S201 to S203 in embodiment corresponding to FIG. 2, and details are not described herein again.

S304. When a push request sent by a client is received, obtain user information carried in the push request, and obtain, from the target data table, to-be-pushed service data having to-be-pushed user group type information matching the user information as first to-be-pushed service data.

Optionally, when the client logs in to the public instant communication platform (the public instant communication platform refers to the official-account background server in the embodiment corresponding to FIG. 1, and may specifically be a Wechat official account background or a QQ official account background), the public instant communication platform may send the push request to the service server. Before the user goes online, the service server may pre-establish a reverse index offline based on to-be-pushed user group type information corresponding to each piece of to-be-pushed service data in the target data table. After receiving the push request (that is, after the user goes online), the service server may obtain the user information carried in the push request, and obtain, from the target data table, the to-be-pushed service data having the to-be-pushed user group type information matching the user information as the first to-be-pushed service data. For example, the user information includes a Wechat account number of the user. The service server parses a user avatar corresponding to the Wechat account number of the user, to determine basic information (for example, a gender, an age range, and the like) of the user. The service server further selects, as the first to-be-pushed service data from the target data table, to-be-pushed service data whose to-be-pushed user group type information is in conformity with the basic information of the user.

S305. Pre-estimate a click-through rate corresponding to each piece of first to-be-pushed service data, and select a preset amount of first to-be-pushed service data in descending order of the click-through rates as second to-be-pushed service data.

Optionally, the service server further pre-estimates a click-through rate (which may be a lightweight click-through rate, for example, may be a click-through rate determined based on the resolution or a data content demand corresponding to each piece of first to-be-pushed service data) corresponding to each piece of first to-be-pushed service data, and selects a preset amount of first to-be-pushed service data in descending order of the click-through rates as second to-be-pushed service data. For example, if there are 100 pieces of first to-be-pushed service data, and the preset amount is 50, the service server may rank the 100 pieces of first to-be-pushed service data in descending order of click-through rates corresponding to the 100 pieces of first to-be-pushed service data, and determine the first 50 pieces of first to-be-pushed service data as the second to-be-pushed service data.

S306. Calculate a user behavior characteristic corresponding to the user information, and select, based on service information corresponding to each piece of second to-be-pushed service data and the user behavior characteristic, second to-be-pushed service data best matching the user information as the target to-be-pushed service data.

The service server may further calculate the user behavior characteristic corresponding to the user information, and select, based on service information corresponding to each piece of second to-be-pushed service data and the user behavior characteristic, second to-be-pushed service data best matching the user information as the target to-be-pushed service data. The service information may include advertisement bid information and advertisement order completion. Therefore, a specific implementation process of the step of calculating the user behavior characteristic corresponding to the user information, and selecting, based on service information corresponding to each piece of second to-be-pushed service data and the user behavior characteristic, second to-be-pushed service data best matching the user information as the target to-be-pushed service data may be: determining, based on advertisement bid information and advertisement order completion corresponding to each piece of second to-be-pushed service data, an exposure probability corresponding to each piece of second to-be-pushed service data, collecting, in a historical time period, statistics about the user behavior characteristic (for example, advertisement data clicked and browsed in a current day) associated with the user information, analyzing, based on the user behavior characteristic, a favorite service data type of a user (that is, analyzing types of advertisements favorite by the user, for example, sports and games), then calculating, based on the favorite service data type of the user, the exposure probability corresponding to each piece of second to-be-pushed service data, and the pre-estimated click-through rate (the click-through rate herein may be a high-precision click-through rate), a recommendation score corresponding to each piece of second to-be-pushed service data, and finally determining second to-be-pushed service data having a highest recommendation score as the target to-be-pushed service data (the second to-be-pushed service data having the highest recommendation score may be advertisement data that is favorite by the user and that is most possibly clicked and browsed by the user).

S307. If the service data packet further includes at least one landing page address, send the target to-be-pushed service data, a click link corresponding to the target to-be-pushed service data, and the at least one landing page address to the client on a public instant communication platform, so that the client triggers, based on a click operation, the click link to report click information, and jumps, based on the click operation, to a landing page address corresponding to a click region.

Optionally, if the service data packet further includes at least one landing page address, the service server may further encapsulate the at least one landing page address into the target to-be-pushed service data. Further, the service server may send the target to-be-pushed service data and the click link that carry the at least one landing page address to the public instant communication platform together, and the public instant communication platform forwards the target to-be-pushed service data and the click link to the client, so that the client triggers the click link based on a click operation to report click information, and jumps to a landing page address corresponding to a click region based on the click operation (for example, the user performs a click operation on the picture material a in a presentation region in which the multimedia presentation frame data b1 in the advertisement is located, and in this case, the terminal may jumps to the landing page address b5 bound to the picture material a). That is, the landing page address is linked to the mobile terminal, so that the mobile terminal can determine a click region based on the click operation of the user, and further jump to a landing page address corresponding to the click region. Because triggering of the click link is merely used for reporting a click behavior of the mobile terminal, there is no need to configure a corresponding click link for each landing page, that is, one advertisement (namely, the target to-be-pushed service data) only needs to have one click link. Therefore, traffic consumed by the mobile terminal can be reduced. Using the advertisement B in Table 1 in the embodiment corresponding to FIG. 2 as an example, if the public instant communication platform sends target to-be-pushed service data and a click link that correspond to the advertisement B to the mobile terminal, the landing page address b5 being bound to the picture material a in the multimedia presentation frame data b1, and the landing page b6 being bound to the picture material b in the multimedia presentation frame data b2, when the user clicks a presentation region in which the multimedia presentation frame data b1 is located in the advertisement interface corresponding to the target to-be-pushed service data, the mobile terminal may extract the landing page address b5 that is bound to the picture material a in the clicked presentation region, and jump to the landing page address b5. In addition, the mobile terminal may trigger the click link to report a click behavior to the service server (regardless of clicking the picture material a or the picture material b in the advertisement interface, the click link may be triggered to report the click behavior of the user). After the client is connected and the push request is sent, the service server can select the target to-be-pushed service data from the target data table within 100 ms and send the target to-be-pushed service data to the public instant communication platform. Therefore, it can be ensured that the pushed target to-be-pushed service data can quickly and accurately arrive at the client, avoids that the target to-be-pushed service data cannot be accurately pushed to the client due to uncertainty of a connection time of the client, and also avoids that the pushed target to-be-pushed service data is overwhelmed in historical advertisement data, thereby improving the ROI of the advertiser.

S308. Obtain at least one of arrival information, click information, and reading information that correspond to the target to-be-pushed service data and that is fed back by the client.

Optionally, after the client receives the target to-be-pushed service data, the client may report arrival information to the public instant communication platform. Then, the public instant communication platform feeds back the arrival information to the service server, so that the service server may analyze a message arrival rate of each piece of to-be-pushed service data based on the collected arrival information. When the client detects a click operation on the target to-be-pushed service data, the client may report click information to the public instant communication platform by using the click link. Then, the public instant communication platform feeds back the click information to the service server. Then, the service server collects, based on the collected click information, a click-through rate of the to-be-pushed service data to be pushed subsequently, and analyzes the user behavior characteristic. When the client detects a click operation on a graph-text message, the client may report reading information to the public instant communication platform. Then, the public instant communication platform feeds back the reading information to the service server.

According to this embodiment of this application, the service data packet is obtained, and the at least one piece of multimedia presentation frame data in the service data packet is respectively added to different rows in the service data table, each row in the service data table corresponding to a different row number. Based on a row-to-column conversion operation performed on the multimedia presentation frame data in the service data table, a capability of storing the multimedia presentation frame data by the service data table can be effectively improved, thereby improving a capability of extending the service data packet, that is, one service data packet can carry more multimedia presentation frame data. In this way, one advertisement may include more multimedia data such as pictures, videos, and text. Further, the material data corresponding to each piece of multimedia presentation frame data is selected from the preset database based on the material configuration information in the service data packet, the selected material data is added to the material data table, and the at least one row number is configured for each piece of material data in the material data table based on the material configuration information. The multimedia presentation frame data and the material data having a same row number in the service data table and the material data table are fused, to obtain the to-be-pushed service data corresponding to the service data packet, and the to-be-pushed service data is stored in the target data table. The material data can be effectively reused by setting the material data table and the material configuration information. That is, same material data can be applied to multimedia presentation frame data in different service data packets without repeatedly uploading the same material data. When receiving the push request sent by the client, the user behavior characteristic corresponding to the user information carried in the push request is calculated, the target to-be-pushed service data is selected from the target data table based on the service information corresponding to each piece of to-be-pushed service data in the target data table, the user information, and the user behavior characteristic, and the target to-be-pushed service data is sent to the client. When the user goes online (that is, the push request is generated), target to-be-pushed service data matching the user is analyzed, and then the target to-be-pushed service data is delivered to the client. Therefore, the client checks only the target to-be-pushed service data, to improve a probability that the target to-be-pushed service data is clicked and read, thereby avoiding a waste of traffic in a user terminal.

Figure 4:
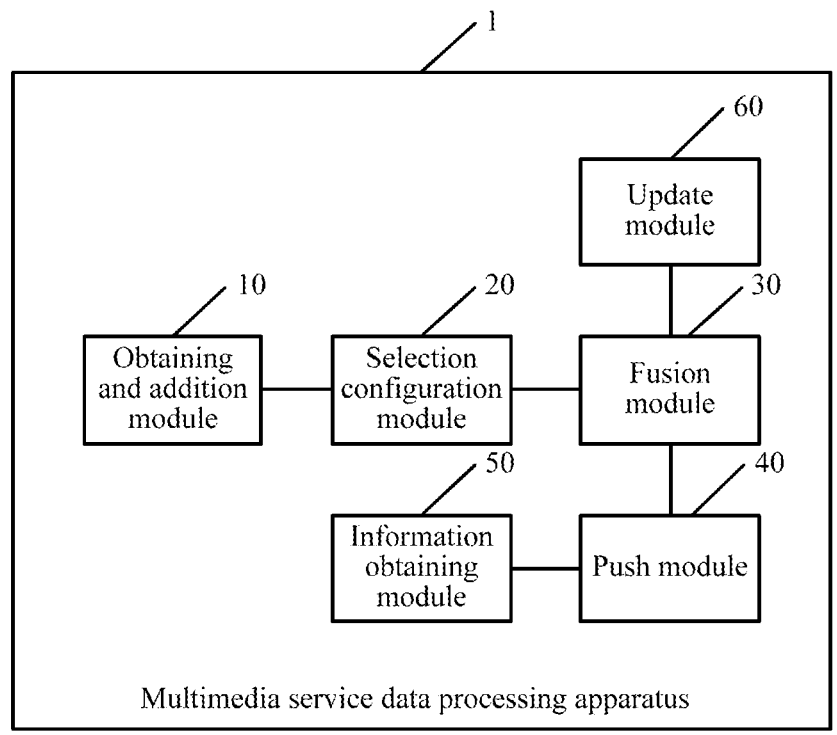
FIG. 4 is a schematic structural diagram of a multimedia service data processing apparatus according to an embodiment of this application.

Referring to FIG. 4, FIG. 4 is a schematic structural diagram of a multimedia service data processing apparatus 1 according to an embodiment of this application. The multimedia service data processing apparatus 1 may be applied to the service server in the embodiment corresponding to FIG. 1. The multimedia service data processing apparatus 1 may include an obtaining and addition module 10, a selection configuration module 20, a fusion module 30, a push module 40, an information obtaining module 50, and an update module 60.

The obtaining and addition module 10 is configured to: obtain a service data packet, and add at least one piece of multimedia presentation frame data in the service data packet respectively to different rows in a service data table, each row in the service data table corresponding to a different row number.

The selection configuration module 20 is configured to: select, from a preset database based on material configuration information in the service data packet, material data corresponding to each piece of multimedia presentation frame data, add the selected material data to a material data table, and configure at least one row number for each piece of material data in the material data table based on the material configuration information, the material configuration information including material information that needs to be configured for each piece of multimedia presentation frame data.

The fusion module 30 is configured to: fuse multimedia presentation frame data and material data having a same row number in the service data table and the material data table, to obtain to-be-pushed service data corresponding to the service data packet, and store the to-be-pushed service data in a target data table.

The push module 40 is configured to: when receiving a push request sent by a client, calculate a user behavior characteristic corresponding to user information carried in the push request, select, from the target data table, target to-be-pushed service data based on service information corresponding to each piece of to-be-pushed service data in the target data table, the user information, and the user behavior characteristic, and send the target to-be-pushed service data to the client.

For specific functional implementation of the obtaining and addition module 10, the selection configuration module 20, the fusion module 30, and the push module 40, refer to S201 to S204 in the embodiment corresponding to FIG. 2, and details are not described herein again.

The information obtaining module 50 is configured to obtain at least one of arrival information, click information, and reading information that correspond to the target to-be-pushed service data and that is fed back by the client.

For a specific functional implementation of the information obtaining module 50, refer to S308 in the embodiment corresponding to FIG. 3, and details are not described herein again.

The update module 60 is configured to: when receiving update data associated with the service data packet, search the target data table for to-be-pushed service data having an identifier of the service data packet, and update the found to-be-pushed service data based on the update data.

Optionally, the update module 60 is configured to set a corresponding identifier (namely, an advertisement ID) of the service data packet for each piece of to-be-pushed service data in the target data table by using a subscription service may. Therefore, when an advertiser needs to update material data corresponding to one piece of multimedia presentation frame data in the service data packet, the update module 60 may be configured to: receive multimedia update sub data associated with the service data packet, and search, by using the subscription service, the target data table for the to-be-pushed service data having the identifier of the service data packet, and update the found to-be-pushed service data based on the multimedia update sub data. It can be learned that one advertisement ID may be bound to a plurality of pieces of multimedia presentation frame data by using the subscription service, so as to find corresponding to-be-pushed service data more efficiently when the multimedia presentation frame data is updated, and update the found to-be-pushed service data. Optionally, the advertisement ID may also be bound to at least one landing page address by using the subscription service. The update module 60 may further finding, based on a row number corresponding to the updated material data when the material data is updated, multimedia presentation frame data having the same row number may be found by using the data integration service, so as to fuse the updated material data and the found multimedia presentation frame data again, and further update corresponding to-be-pushed service data.

Figure 5:
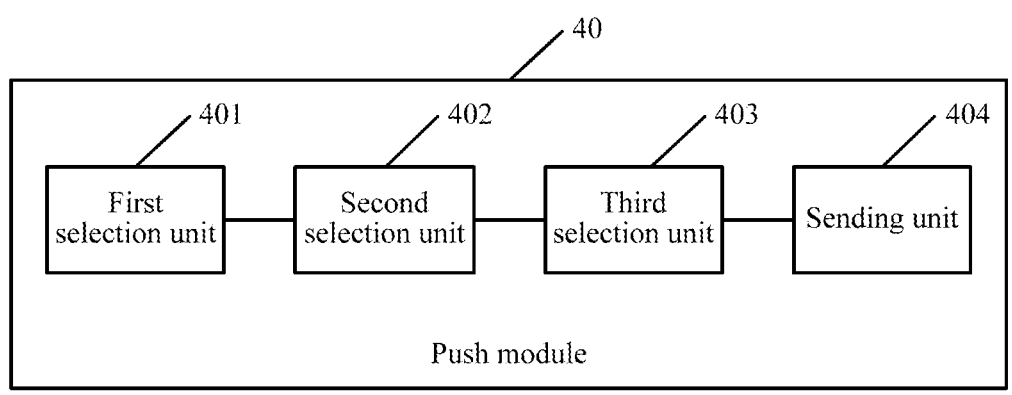
FIG. 5 is a schematic structural diagram of a push module according to an embodiment of this application.

Optionally, referring to FIG. 5, FIG. 5 is a schematic structural diagram of the push module 40 according to an embodiment of this application. The push module 40 may include a first selection unit 401, a second selection unit 402, a third selection unit 403, and a sending unit 404.

The first selection unit 401 is configured to obtain the user information carried in the push request, and obtain, from the target data table, to-be-pushed service data having to-be-pushed user group type information matching the user information as first to-be-pushed service data. The service data packet carries to-be-pushed user group type information.

The second selection unit 402 is configured to: pre-estimate a click-through rate corresponding to each piece of first to-be-pushed service data, and select a preset amount of first to-be-pushed service data in descending order of the click-through rates as second to-be-pushed service data.

The third selection unit 403 is configured to: calculate the user behavior characteristic corresponding to the user information, and select, based on service information corresponding to each piece of second to-be-pushed service data and the user behavior characteristic, second to-be-pushed service data best matching the user information as the target to-be-pushed service data.

The sending unit 404 is configured to send the target to-be-pushed service data to a public instant communication platform, so that the public instant communication platform delivers the target to-be-pushed service data to the client.

The sending unit 404 may be configured to: if the service data packet further includes at least one landing page address, send the target to-be-pushed service data, a click link corresponding to the target to-be-pushed service data, and at least one landing page address to the client on the public instant communication platform, so that the client triggers the click link based on a click operation to report click information, and jumps to a landing page address corresponding to a click region based on the click operation.

For specific functional implementation of the first selection unit 401, the second selection unit 402, the third selection unit 403, and the sending unit 404, refer to S304 to S307 in the embodiment corresponding to FIG. 3, and details are not described herein again.

Figure 6:
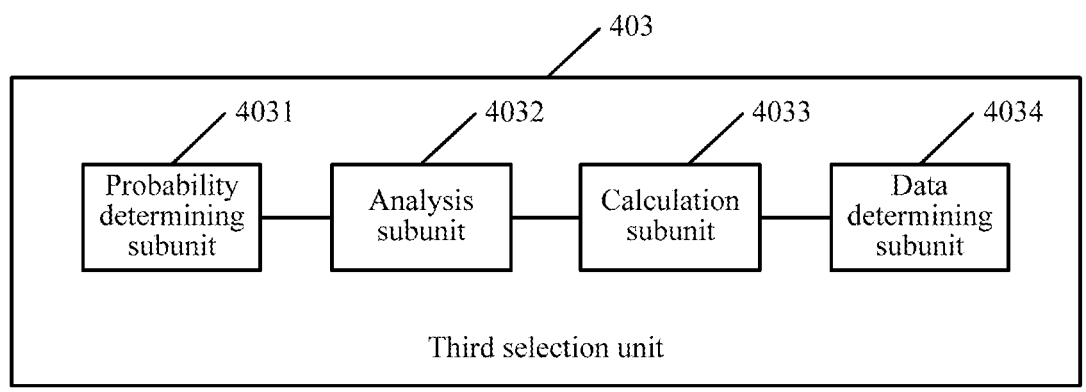
FIG. 6 is a schematic structural diagram of a third selection unit according to an embodiment of this application.

Optionally, referring to FIG. 6, FIG. 6 is a schematic structural diagram of the third selection unit 403 according to an embodiment of this application. The third selection unit 403 may include a probability determining subunit 4031, an analysis subunit 4032, a calculation subunit 4033, and a data determining subunit 4034.

The probability determining subunit 4031 is configured to determine, based on the service information corresponding to each piece of second to-be-pushed service data, an exposure probability corresponding to each piece of second to-be-pushed service data.

The analysis subunit 4032 is configured to: collect, in a historical time period, statistics about the user behavior characteristic associated with the user information, and analyze, based on the user behavior characteristic, a favorite service data type of a user.

The calculation subunit 4033 is configured to calculate, based on the favorite service data type of the user, the exposure probability corresponding to each piece of second to-be-pushed service data, and the pre-estimated click-through rate, a recommendation score corresponding to each piece of second to-be-pushed service data.

The data determining subunit 4034 is configured to determine second to-be-pushed service data having a highest recommendation score as the target to-be-pushed service data.

According to this embodiment of this application, the service data packet is obtained, and the at least one piece of multimedia presentation frame data in the service data packet is respectively added to different rows in the service data table, each row in the service data table corresponding to a different row number. Based on a row-to-column conversion operation performed on the multimedia presentation frame data in the service data table, a capability of storing the multimedia presentation frame data by the service data table can be effectively improved, thereby improving a capability of extending the service data packet, that is, one service data packet can carry more multimedia presentation frame data. In this way, one advertisement may include more multimedia data such as pictures, videos, and text. Further, the material data corresponding to each piece of multimedia presentation frame data is selected from the preset database based on the material configuration information in the service data packet, the selected material data is added to the material data table, and the at least one row number is configured for each piece of material data in the material data table based on the material configuration information. The multimedia presentation frame data and the material data having a same row number in the service data table and the material data table are fused, to obtain the to-be-pushed service data corresponding to the service data packet, and the to-be-pushed service data is stored in the target data table. The material data can be effectively reused by setting the material data table and the material configuration information. That is, same material data can be applied to multimedia presentation frame data in different service data packets without repeatedly uploading the same material data. When receiving the push request sent by the client, the user behavior characteristic corresponding to the user information carried in the push request is calculated, the target to-be-pushed service data is selected from the target data table based on the service information corresponding to each piece of to-be-pushed service data in the target data table, the user information, and the user behavior characteristic, and the target to-be-pushed service data is sent to the client. When the user goes online (that is, the push request is generated), target to-be-pushed service data matching the user is analyzed, and then the target to-be-pushed service data is delivered to the client. Therefore, the client checks only the target to-be-pushed service data, to improve a probability that the target to-be-pushed service data is clicked and read, thereby avoiding a waste of traffic in a user terminal.

Figure 7:
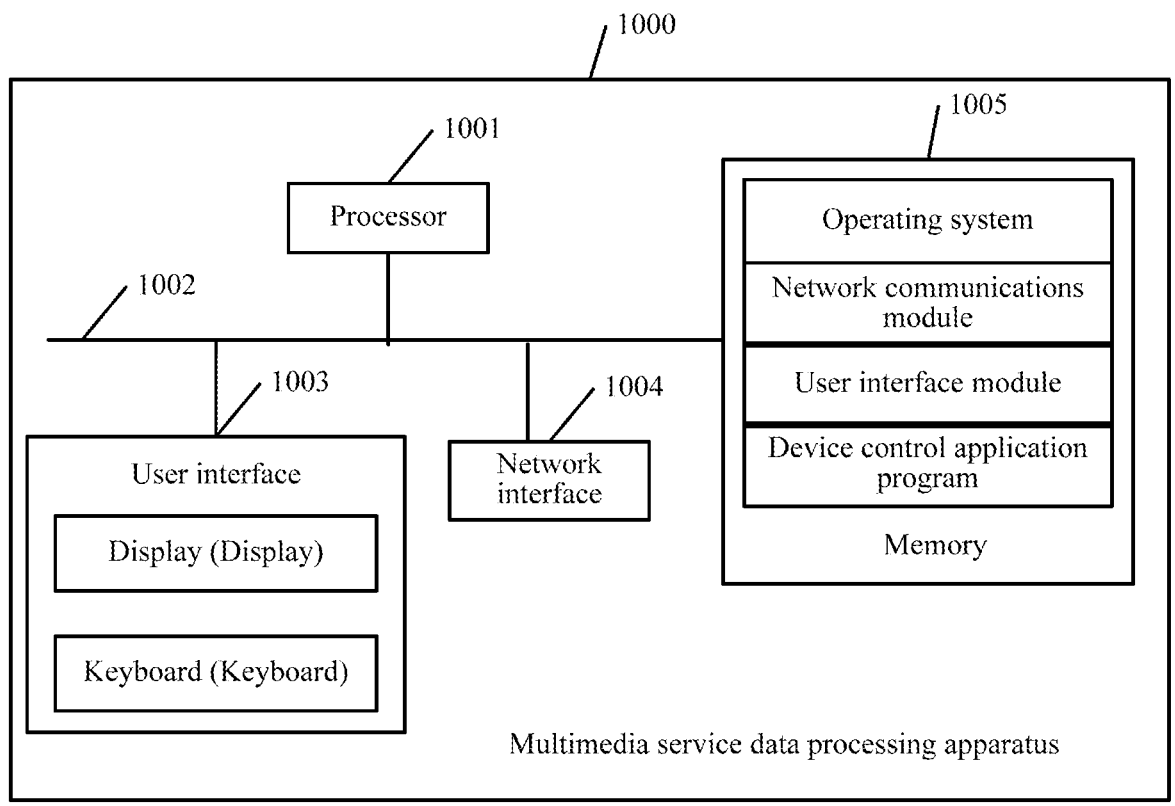
FIG. 7 is a schematic structural diagram of another multimedia service data processing apparatus according to an embodiment of this application.

Referring to FIG. 7, FIG. 7 is a schematic structural diagram of another multimedia service data processing apparatus according to an embodiment of this application. The multimedia service data processing apparatus may correspond to one or more servers. The server may be the foregoing service server 100 and/or the foregoing official-account background server. As shown in FIG. 7, the multimedia service data processing apparatus 1000 may be applied to the service server in the embodiment corresponding to FIG. 1. The multimedia service data processing apparatus 1000 may include at least one processor 1001, for example, a central processing unit (CPU), a microprocessor (MCU), a digital signal processor (DSP), an application processor (AP), a programmable array (PLC), and an application-specific integrated circuit (ASIC), at least one network interface 1004, a user interface 1003, a memory 1005, and at least one communications bus 1002.

The communications bus 1002 is configured to implement connection and communication between the components.

The user interface 1003 may include a display (Display), a keyboard (Keyboard), and optionally, the user interface 1003 may further include a standard wired interface and a standard wireless interface. The network interface 1004 may include a standard wired interface and a standard wireless interface (such as a WiFi interface).

The memory 1005 may be a high-speed RAM memory, or may be a non-volatile memory (non-volatile memory), for example, at least one magnetic disk memory.

Optionally, the memory 1005 may further be at least one storage apparatus that is located far away from the processor 1001.

As shown in FIG. 7, the memory 1005, which is used as a computer storage medium, may include an operating system, a network communications module, a user interface module, and a device control application program.

In the multimedia service data processing apparatus 1000 shown in FIG. 7, the network interface 1004 is mainly configured to connect a public instant communication platform. The user interface 1003 is mainly configured to provide an input interface for a user. The processor 1001 may be configured to invoke the device control application program stored in the memory 1005 to implement at least the following steps:

obtaining a service data packet, and adding at least one piece of multimedia presentation frame data in the service data packet respectively to different rows in a service data table, each row in the service data table corresponding to a different row number;

selecting, from a preset database based on material configuration information in the service data packet, material data corresponding to each piece of multimedia presentation frame data, adding the selected material data to a material data table, and configuring at least one row number for each piece of material data in the material data table based on the material configuration information, the material configuration information including material information that needs to be configured for each piece of multimedia presentation frame data;

fusing multimedia presentation frame data and material data having a same row number in the service data table and the material data table, to obtain to-be-pushed service data corresponding to the service data packet, and storing the to-be-pushed service data in a target data table; and when receiving a push request sent by a client, calculating a user behavior characteristic corresponding to user information carried in the push request, selecting, from the target data table, target to-be-pushed service data based on service information corresponding to each piece of to-be-pushed service data in the target data table, the user information, and the user behavior characteristic, and sending the target to-be-pushed service data to the client.

In an embodiment, the service data packet carries to-be-pushed user group type information.

When performing the calculating a user behavior characteristic corresponding to user information carried in the push request, selecting, from the target data table, target to-be-pushed service data based on service information corresponding to each piece of to-be-pushed service data in the target data table, the user information, and the user behavior characteristic, and sending the target to-be-pushed service data to the client, the processor 1001 may further perform the following steps:

obtaining the user information carried in the push request, and obtaining, from the target data table, to-be-pushed service data having to-be-pushed user group type information matching the user information as first to-be-pushed service data;

pre-estimating a click-through rate corresponding to each piece of first to-be-pushed service data, and selecting a preset amount of first to-be-pushed service data in descending order of the click-through rates as second to-be-pushed service data;

calculating the user behavior characteristic corresponding to the user information, and selecting, based on service information corresponding to each piece of second to-be-pushed service data and the user behavior characteristic, second to-be-pushed service data best matching the user information as the target to-be-pushed service data; and sending the target to-be-pushed service data to a public instant communication platform, so that the public instant communication platform delivers the target to-be-pushed service data to the client.

In an embodiment, when performing the calculating the user behavior characteristic corresponding to the user information, and selecting, based on service information corresponding to each piece of second to-be-pushed service data and the user behavior characteristic, second to-be-pushed service data best matching the user information as the target to-be-pushed service data, the processor 1001 may further perform the following steps:

determining, based on the service information corresponding to each piece of second to-be-pushed service data, an exposure probability corresponding to each piece of second to-be-pushed service data;

collecting, in a historical time period, statistics about the user behavior characteristic associated with the user information, and analyzing, based on the user behavior characteristic, a favorite service data type of a user;

calculating, based on the favorite service data type of the user, the exposure probability corresponding to each piece of second to-be-pushed service data, and the pre-estimated click-through rate, a recommendation score corresponding to each piece of second to-be-pushed service data; and determining second to-be-pushed service data having a highest recommendation score as the target to-be-pushed service data.

In an embodiment, when performing the sending the target to-be-pushed service data to a public instant communication platform, the processor 1001 may further perform the following step:

if the service data packet further includes at least one landing page address, sending, to the client on the public instant communication platform, target to-be-pushed service data and a click link that bind the at least one landing page address, so that the client triggers the click link based on a click operation to report click information, and jumps to a landing page address corresponding to a click region based on the click operation.

In an embodiment, the processor 1001 further performs the following step:

obtaining at least one of arrival information, click information, and reading information that correspond to the target to-be-pushed service data and that is fed back by the client.

In an embodiment, the processor 1001 further performs the following step:

when receiving update data associated with the service data packet, searching the target data table for to-be-pushed service data having an identifier of the service data packet, and updating the found to-be-pushed service data based on the update data.

According to this embodiment of this application, the service data packet is obtained, and the at least one piece of multimedia presentation frame data in the service data packet is respectively added to different rows in the service data table, each row in the service data table corresponding to a different row number. Based on a row-to-column conversion operation performed on the multimedia presentation frame data in the service data table, a capability of storing the multimedia presentation frame data by the service data table can be effectively improved, thereby improving a capability of extending the service data packet, that is, one service data packet can carry more multimedia presentation frame data. In this way, one advertisement may include more multimedia data such as pictures, videos, and text. Further, the material data corresponding to each piece of multimedia presentation frame data is selected from the preset database based on the material configuration information in the service data packet, the selected material data is added to the material data table, and the at least one row number is configured for each piece of material data in the material data table based on the material configuration information. The multimedia presentation frame data and the material data having a same row number in the service data table and the material data table are fused, to obtain the to-be-pushed service data corresponding to the service data packet, and the to-be-pushed service data is stored in the target data table. The material data can be effectively reused by setting the material data table and the material configuration information. That is, same material data can be applied to multimedia presentation frame data in different service data packets without repeatedly uploading the same material data. When receiving the push request sent by the client, the user behavior characteristic corresponding to the user information carried in the push request is calculated, the target to-be-pushed service data is selected from the target data table based on the service information corresponding to each piece of to-be-pushed service data in the target data table, the user information, and the user behavior characteristic, and the target to-be-pushed service data is sent to the client. When the user goes online (that is, the push request is generated), target to-be-pushed service data matching the user is analyzed, and then the target to-be-pushed service data is delivered to the client. Therefore, the client checks only the target to-be-pushed service data, to improve a probability that the target to-be-pushed service data is clicked and read, thereby avoiding a waste of traffic in a user terminal.

An embodiment of this application further provides a computer storage medium. The computer storage medium stores a computer program. After being executed by a processor, the computer program can implement the multimedia service data processing method according to one or more of the foregoing embodiments.

The computer storage medium provided in this embodiment may be various types of storage media, for example, may be various media that can store program code, such as a mobile storage device, a ROM, a magnetic disk, or an optical disc, and optionally, may be a non-transitory storage medium or a non-volatile storage medium.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

In the several embodiments provided in the present application, it should be understood that the disclosed apparatus and method may be implemented in other manners. The described device embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as a unit may be or may not be a physical unit. That is, the units may be located in a same place, or may be distributed to many network units. Some or all of the units need to be selected according to actual requirements to implement the purpose of the solution of the embodiments.

In addition, the functional units in the embodiments of this application may be integrated into one processing part, or each of the units may exist alone physically, or two or more units may be integrated into one unit. The integrated units may be implemented in a form of hardware, or may be implemented in a form of a software functional unit.

The foregoing descriptions are merely embodiments of this application, but are not intended to limit this application. Therefore, equivalent changes made according to the claims of this application still fall within the scope of this application.

INDUSTRIAL PRACTICABILITY

In the embodiments of this application, after obtaining a service data packet, a background server of a service server first performs row division processing to generate a service data table that may include a plurality of rows. In this way, the number of presentation frames corresponding to a maximum amount of multimedia presentation frame data included in the service data packet may be not limited to the number of presentation frames included in one row in an advertisement interface, so as to effectively improve a capability of storing the multimedia presentation frame data by the service data table, thereby improving a capability of extending the service data packet, that is, one service data packet can carry more multimedia presentation frame data. In addition, the service data packet may carry material configuration information. This is not limited to that all material data needs to be carried. In this way, the material data is reused, and transmission of, for example, same redundant material data, is reduced. Moreover, service data matching a user is pushed to a client with reference to user information and a user behavior characteristic only when the client sends a push request, thereby precisely pushing the service data, improving the click-through rate and the reading rate, and reducing the information interference to the user. Apparently, the technical solutions provided in the embodiments of this application have beneficial effects in a plurality of dimensions and aspects. Computer-executable code such as a computer program that can perform a corresponding operation may be introduced in the service server for simple implementation. Therefore, the technical solutions apparently have features such as high implementability, high industrial reproducibility, and high generalibility.

What is claimed is:

1. A method for processing multimedia service data, comprising:
   receiving, by processing circuitry of an information processing apparatus, a first service data packet that includes at least first information for a first multimedia presentation frame and second information for a second multimedia presentation frame;
   storing, by the processing circuitry, the first information for the first multimedia presentation frame in a first row having a first row number in a service data table, and the second information for the second multimedia presentation frame in a second row having a second row number that is different from the first row number in the service data table, the first multimedia presentation frame being associated with first position coordinates for display on a presentation interface, the second multimedia presentation frame being associated with second position coordinates for display on the presentation interface;

determining, by the processing circuitry and from a preset database, first material data for the first multimedia presentation frame and second material data for the second multimedia presentation frame based on material configuration information in the first service data packet;

associating, by the processing circuitry, the first material data in a material data table with the first row number of the service data table and the second material data in the material data table with the second row number of the service data table; and generating, by the processing circuitry, first multimedia service data corresponding to the first service data packet based on the association between the service data table and the material data table, the first multimedia service data including the first multimedia presentation frame filled with the first material data that is associated by the first row number of the service data table such that the first material data is configured for display within the first multimedia presentation frame on the presentation interface, and the second multimedia presentation frame filled with the second material data that is associated by the second row number of the service data table such that the second material data is configured for display within the second multimedia presentation frame on the presentation interface.

2. The method of claim 1, further comprising:
when the material data table lacks the first material data:
adding the first material data into an empty row of the material data table; and
associating the first material data in a material data table with the first row number.

3. The method of claim 1, further comprising:
storing the first multimedia service data with other multimedia service data in a target data table.

4. The method of claim 3, further comprising:
receiving, from a client device, a push request carrying user information;
determining a user behavior characteristic based on the user information;
selecting a target multimedia service data from the target data table based on service information of the target multimedia service data and at least one of the user information and the user behavior characteristic; and
sending the target multimedia service data to the client device.

5. The method according to claim 4, further comprising:
storing the first multimedia service data with a first user group information that is carried in the first service data packet in the target data table; and
storing the other multimedia service data with respective user group information.

6. The method according to claim 5, further comprising:
selecting a first group of multimedia service data with specific user group information that matches the user information;

selecting a second group of multimedia service data from the first group of multimedia service data based on sorted click-through rates of the first group of multimedia service data; and
selecting the target multimedia service data from the second group of multimedia service data based on the user behavior characteristic.

7. The method according to claim 6, further comprising:
determining, based on service information corresponding to the second group of multimedia service data, exposure probabilities for the second group of multimedia service data;
collecting, in a historical time period, statistics of the user behavior characteristic associated with the user information;
determining a favorite service data type based on the user behavior characteristic;
calculating, recommendation scores for the second group of multimedia service data based on the favorite service data type, the exposure probabilities, and the sorted click-through rates; and
determining the target multimedia service data from the second group of multimedia service data that has a highest recommendation score.

8. The method according to claim 4, further comprising:
when the first service data packet comprises a landing page address, sending, the target multimedia service data with a click region that is bound with the landing page address to a server device for a public instant communication platform that forwards the target multimedia service data to the client device to cause a call to a landing page corresponding to the landing page address in response to a click in the click region.

9. The method according to claim 8, further comprising:
obtaining at least one of arrival information, click information, and reading information that correspond to the target multimedia service data and are fed back from the client device.

10. The method according to claim 3, further comprising:
storing, in the target data table, the first multimedia service data with a packet identifier of the first service data packet;
receiving update data associated with the first service data packet;
searching the target data table for the packet identifier of the first service data packet to fine the first multimedia service data; and
updating the first multimedia service data based on the update data.

11. An apparatus for processing multimedia service data, comprising:
interface circuitry configured to receive a first service data packet that includes at least first information for a first multimedia presentation frame and second information for a second multimedia presentation frame; and
processing circuitry configured to:
store the first information for the first multimedia presentation frame in a first row having a first row number in a service data table, and the second information for the second multimedia presentation frame in a second row having a second row number that is different from the first row number in the service data table, the first multimedia presentation frame being associated with first position coordinates for display on a presentation interface, the second multimedia presentation frame being associated with second position coordinates for display on the presentation interface;

determine, from a preset database, first material data for the first multimedia presentation frame and second material data for the second multimedia presentation frame based on material configuration information in the first service data packet;

associate the first material data in a material data table with the first row number of the service data table and the second material data in the material data table with the second row number of the service data table; and generate first multimedia service data corresponding to the first service data packet based on the association between the service data table and the material data table, the first multimedia service data including the first multimedia presentation frame filled with the first material data that is associated by the first row number of the service data table such that the first material data is configured for display within the first multimedia presentation frame on the presentation interface, and the second multimedia presentation frame filled with the second material data that is associated by the second row number of the service data table such that the second material data is configured for display within the second multimedia presentation frame on the presentation interface.

12. The apparatus of claim 11, wherein the processing circuitry is further configured to:

when the material data table lacks the first material data:
 add the first material data into an empty row of the material data table; and
 associate the first material data in a material data table with the first row number.

13. The apparatus of claim 11, wherein the processing circuitry is further configured to:

store the first multimedia service data with other multimedia service data in a target data table.

14. The apparatus of claim 13, wherein:

the interface circuitry is configured to receive, from a client device, a push request carrying user information; and the processing circuitry is configured to:
 determine a user behavior characteristic based on the user information;
 select a target multimedia service data from the target data table based on service information of the target multimedia service data and at least one of the user information and the user behavior characteristic; and
 send, via the interface circuitry, the target multimedia service data to the client device.

15. The apparatus according to claim 14, wherein the processing circuitry is further configured to:

store the first multimedia service data with a first user group information that is carried in the first service data packet in the target data table; and store the other multimedia service data with respective user group information.

16. The apparatus according to claim 15, wherein the processing circuitry is further configured to:

select a first group of multimedia service data with specific user group information that matches the user information;

select a second group of multimedia service data from the first group of multimedia service data based on sorted click-through rates of the first group of multimedia service data; and select the target multimedia service data from the second group of multimedia service data based on the user behavior characteristic.

17. The apparatus according to claim 16, wherein the processing circuitry is further configured to:

determine, based on service information corresponding to the second group of multimedia service data, exposure probabilities for the second group of multimedia service data;

collect, in a historical time period, statistics of the user behavior characteristic associated with the user information;

determine a favorite service data type based on the user behavior characteristic;

calculate, recommendation scores for the second group of multimedia service data based on the favorite service data type, the exposure probabilities, and the sorted click-through rates; and determine the target multimedia service data from the second group of multimedia service data that has a highest recommendation score.

18. The apparatus according to claim 14, wherein the processing circuitry is further configured to:

when the first service data packet comprises a landing page address, send, via the interface circuitry, the target multimedia service data with a click region that is bound with the landing page address to a server device for a public instant communication platform that forwards the target multimedia service data to the client device to cause a call to a landing page corresponding to the landing page address in response to a click in the click region.

19. The apparatus according to claim 18, wherein the processing circuitry is further configured to:

obtain at least one of arrival information, click information, and reading information that correspond to the target multimedia service data and are fed back from the client device.

20. A non-transitory computer-readable medium storing instructions which when executed by a computer cause the computer to perform:

receiving a first service data packet that includes at least first information for a first multimedia presentation frame and second information for a second multimedia presentation frame;

storing the first information for the first multimedia presentation frame in a first row having a first row number in a service data table, and the second information for the second multimedia presentation frame in a second row having a second row number that is different from the first row number in the service data table, the first multimedia presentation frame being associated with first position coordinates for display on a presentation interface, the second multimedia presentation frame being associated with second position coordinates for display on the presentation interface;

determining first material data for the first multimedia presentation frame and second material data for the second multimedia presentation frame based on material configuration information in the first service data packet;

associating the first material data in a material data table with the first row number of the service data table and the second material data in the material data table with the second row number of the service data table; and generating first multimedia service data corresponding to the first service data packet based on the association between the service data table and the material data table, the first multimedia service data including the first multimedia presentation frame filled with the first material data that is associated by the first row number of the service data table such that the first material data is configured for display within the first multimedia presentation frame on the presentation interface, and the second multimedia presentation frame filled with the second material data that is associated by the second row number of the service data table such that the second material data is configured for display within the second multimedia presentation frame on the presentation interface.

* * * * *